Figure 1:
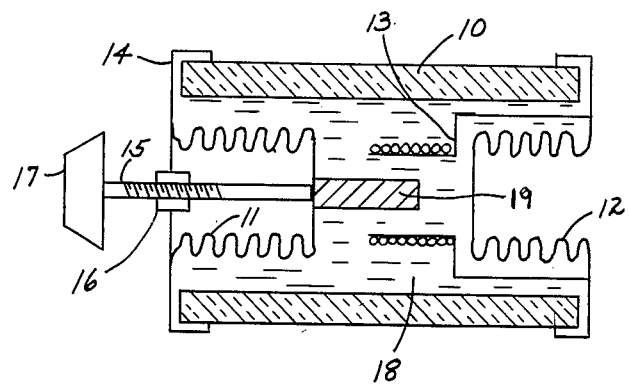

Nov. 20, 1951   D. B. PECK   2,575,726
HERMETICALLY SEALED ADJUSTABLE DEVICE
Filed July 30, 1949   2 SHEETS—SHEET 1

DAVID B. PECK
INVENTOR

BY
Arthur G. Connolly
his ATTORNEY

DAVID B. PECK
INVENTOR

BY
Arthur G. Connolly
his ATTORNEY

Patented Nov. 20, 1951

2,575,726

UNITED STATES PATENT OFFICE 2,575,726

HERMETICALLY SEALED ADJUSTABLE DEVICE

David B. Peck, Williamstown, Mass., assignor to Sprague Electric Company, North Adams, Mass., a corporation of Massachusetts Application July 30, 1949, Serial No. 107,802

4 Claims. (Cl. 175—41.5)

This invention relates to improved hermetically sealed adjustable devices and more specifically refers to hermetically sealed, fluid filled variable electrical devices for use over a wide temperature range.

In the past, many fixed devices sensitive to corrosion, humidity etc. have been hermetically sealed in containers with the use of glass-to-metal seals and the like. For example, electrical capacitors, resistors and transformers have been sealed in metal cans with glass or ceramic terminal studs. Adjustable devices, such as resistors or capacitors, particularly when filled with liquid impregnants, have been sealed with lesser degrees of success. Rotary seals, such as provided by compressed rubber or other bearing rings do not provide a true hermetic seal and will leak liquid upon temperature and/or hydraulic pressure changes.

Vacuum type variable capacitors may be sealed with the use of a bellows for adjusting the overlap between capacitor electrodes. With gases under normally atmospheric or high pressure or with liquid fluids, this arrangement is unsatisfactory since temperature changes alter the bellows setting or cause rupture of the container, due to development of high fluid pressures.

It is an object of the present invention to overcome the foregoing and related disadvantages. A further object is to produce new and improved hermetically sealed adjustable devices, particularly when the devices are filled with fluids. A still further object is to produce a novel hermetically sealed liquid filled variable capacitor in a small volume. Additional objects will become apparent from the following description and claims.

In its broad embodiments, the invention is concerned with a hermetically sealed device capable of adjustment by externally applied movements, the device comprising a casing enclosing an adjustable device and two bellows sealed to said casing, one of said bellows being attached to said device to transmit external adjustment thereto and the other of said bellows compensating for volume and pressure changes resulting from the movement of said first bellows.

In its preferred embodiments, the invention is concerned with a hermetically sealed variable electrical device comprising an adjustable electrical device disposed within a substantially rigid casing, said casing being hermetically sealed by means of two bellows and filled with a fluid medium selected from the class containing liquids and gases, the first of said bellows being connected to said electrical device and providing means for adjusting the setting thereof and the second of said bellows providing compensation for volume and pressure changes within said casing resulting from temperature changes and from movement of said first bellows.

In one of its limited embodiments, the invention is concerned with a hermetically sealed electrical device comprising a basic element laterally displaceable with respect to another basic element, disposed within a casing, said casing comprising a substantially rigid annular base plate, on the outer portion of which is sealed a compensating cylindrical bellows and on the inner portion of which is sealed a cylindrical control bellows of smaller diameter in coaxial disposition with said first bellows, one of said basic elements being mounted on the closed end of said compensating bellows at the end thereof opposite to said base plate and the other of said basic elements being mounted on the closed end of said control bellows, the assembly being filled with a liquid material, lateral movement of one of said basic elements with respect to the other of said basic elements being effected by axial movement of said control bellows, the ratio R between said lateral movement and said axial movement being approximately equal to the relation $$R = \frac{D^2 - d^2}{D^2}$$

where $d$ and $D$ are the nominal diameters of the axially moved control bellows and the compensating bellows, respectively.

My invention is based upon a novel combination of movable elements to produce a hermetically sealed adjustable device whose operation is independent of temperature and does not rely on bearing type seals, rotary or any other related type. According to the invention in its broadest aspects, I provide a sealed assembly with one bellows which is used to adjust the setting of a variable device inside the assembly and a second bellows to compensate for the volume change effected by movement of the first bellows and to compensate for changes in fluid volume resulting from temperature expansion or contraction. As a result, the control or adjusting bellows is not varied or actuated by undesired forces and can be exactly calibrated for adjustment setting. The compensating bellows are preferably more flexible (e. g. sensitive to hydraulic pressure differentials) than the control bellows for optimum operation. However, the invention may be practiced successfully with compensating and control bellows of essentially the same inherent flexibility.

In accordance with one of the preferred features of the invention the compensating bellows possess a maximum net volume change equal to at least 1.2 times the maximum setting volume change of the control bellows. I define, for purposes of the present invention, the net volume change as the following:

$$NVC \text{ (net volume change)} = \frac{\pi D^2 h}{4}$$

where D is the mean average diameter of bellows and $h$ refers to the maximum stroke of the bellows, that is, the difference in bellows length between maximum and minimum settings.

For operation of liquid filled variable devices over extreme temperature ranges, I prefer that the NVC ratio between compensating and control bellows be at least 1.5.

In accordance with one of the limited embodiments of the invention, the diameter of the compensating bellows is greater than that of the control bellows. In this way the NVC ratio is more readily approached without the necessity for great increases in compensating bellows length.

In accordance with another limited and preferred embodiment of the invention, an adjustable debice is hermetically sealed in a semi-annular assembly which comprises two co-axial cylindrical bellows, each with one open end sealed to a substantially rigid base plate. Thus, in effect, the housing for the device is similar to a small can inside a big can, with an end closure sealing the end opening between the big can and the little can. In this instance it is usually preferable that the inner bellows serve as the control element and the outer bellows as the compensating element.

A more restricted embodiment of the invention is concerned with a movement ratio control device whose operation is dependent upon a relation existing between the diameters of the control and compensating bellows. The latter are usually, though not necessarily, arranged in a co-axial manner such as described in the paragraph above. Two movable elements are adjusted in a controlled ratio as follows: one element is connected to the control bellows while the other element is affixed to the compensating bellows. If the control bellows is expanded, for example, by use of a screw actuated drive, the first element moves laterally toward the second element. However, as the bellows expands, the encased volume is decreased, causing an increased hydraulic pressure. Instantaneously, the compensating bellows reacts to expand, to again reach the equilibrium volume and hydraulic pressure values. As it expands, the second element, attached to it, is drawn laterally away from the first element. The relative net movement between the two elements is therefore dependent upon some more or less fixed relation between the two bellows.

This relation may be expressed in the following manner: $d$ and $D$ represent the average diameters of the control and compensating bellows, respectively, and $h$ and $H$ represent the gross movements of these same respective bellows. If the hydraulic pressure level within the assembly is to be held at a uniform value, a volume change effected by a movement of the control bellows must be equalled by a volume change in the compensating bellows, as follows $$\frac{\pi d^2 h}{4} = \frac{\pi D^2 H}{4}$$

which reduces to provide the relation $$\frac{h}{H} = \frac{D^2}{d^2}$$

or $$H = \frac{hd^2}{D^2}$$

The net movement between elements controlled by the two bellows is equal to $h-H$, which can be expressed as $$h - \frac{hd^2}{D^2}$$

and the movement ratio may be referred to as the net movement, above, divided by the gross movement $h$ of the control bellows, e. g.

$$\text{Ratio} = \frac{D^2 h - d^2 h}{D^2 h}$$

or $$\frac{D^2 - d^2}{D^2}$$

Thus, for high ratios and very sensitive movement or adjustment control, such a device will employ similar bellows diameters. For more direct ratios (approaching or equal to 1) the compensating bellows diameter may be made very large compared to the control bellows diameter.

It is apparent that ratios greater than 1 may be achieved by operating the device "backwards," that is, with the control bellows having a larger diameter than the compensating bellows.

The hermetically sealed devices of the invention may be constructed of various materials, such as ceramic, glass, plastic and/or metal. For most purposes, combinations of ceramic or glass with the bellows are of particular value.

The bellows themselves may be of metal or, in certain special cases, of plastic material, such as polytetrafluoroethylene, polyamides and the like. For most purposes, bellows may be constructed of the following metals and alloys: brass, bronze, steel, Monel metal, nickel alloys, copper, beryllium copper, platinum, etc. The particular metal and design selected depends in part upon the flexibility required, fluid mediums in contact with the bellows, number of flexures normally expected etc. Multiple ply bellows may be employed.

The variable devices of the invention are particularly useful in the manufacture of hermetically sealed adjustable electrical capacitance, resistance and/or inductance elements. Particularly small devices can be made with co-axial electrical elements, such as capacitors and slug-tuned coils. In certain instances, the bellows elements themselves may serve as electrically active portions, e. g. a bellows may be a capacitor electrode, or a core for controlling field permeability and/or intensity in a cylindrical coil.

The fluid fillant may be a gas or a liquid. The invention is particularly applicable for liquids and gases under high pressure. In the case of electrical assemblies, the fillant, if gaseous, is advisably under high pressure to secure the highest breakdown voltage level. Use of the invention permits maintenance of high pressures within a general range without rupture of the hermetic seal. As gaseous fillants, I mention sulfur hexafluoride, octafluoropropane, decafluorobutane, nitrogen and similar materials. Typical liquid fillants are hydrocarbon oils, liquid polymers of the hydrolysis products of aryl, alkyl and aralkyl chlor silanes, known commercially as the silicone oils, perfluorohydrocarbons, perfluoro aliphatic amines, etc. In the preparation of hermetically sealed variable capacitors, I prefer to use materials with low surface tension, as represented by the perfluoroaliphatic amines.

For further discussion of the invention, reference will be made to the appended drawing, in which Figures 1, 2, 3, and 4 represent simplified schematic sketches of representative hermetically sealed variable devices of the invention.

Referring more specifically to Figure 1, 10 represents a cylindrical insulating casing, into the opposite ends of which are inserted control bellows 11 and compensating bellows 12. On the inner end of control bellows 11 is mounted a permeable slug 19, of iron or other similar material. End cap 14 is fitted over casing 10 and provides a mounting base for threaded yoke 16, through which threaded drive shaft 15 passes. The knob 17 is used to turn shaft 15 and effect contraction or expansion of control bellows 11 and in turn, the displacement of slug 19 within coil 13. The latter is substantially rigidly mounted on the end cap portion of compensating bellows 12. Dielectric fluid 18 fills the free space within the hermetically sealed assembly.

Figure 2:
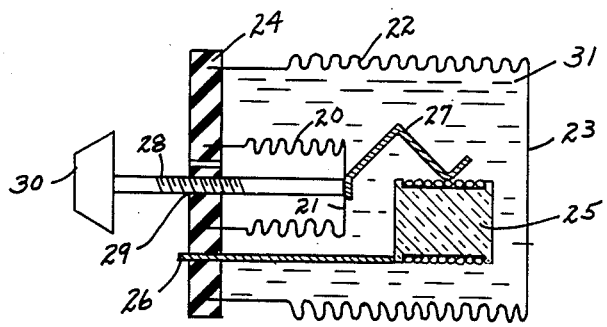

Figure 2 shows a similar hermetically sealed device, in this instance a variable resistance unit. The casing consists of an annular base plate 24 upon which are mounted control bellows 20 and compensation bellows 22. Thus the latter serves as a can container, with closed end 23. On the closed end 21 of control bellows 20 is securely attached a sliding contact 27. This contact wipes against resistance winding 25 terminating in element 26 which is mounted to the base plate 24. Resistance adjustment is accomplished by turning of threaded drive shaft 28 through threaded yoke 29. Knob 30 is provided on shaft 28. Dielectric fluid 31 fills the device.

Figure 3:
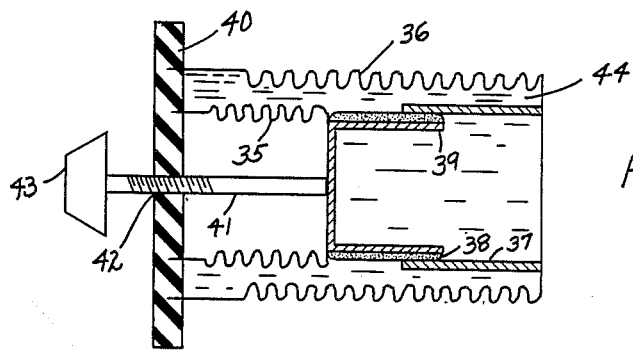

Referring now to Figure 3, a ratio drive device is shown. Here, substantially rigid base plate 40 is an annular element upon which is mounted compensating bellows 36 and control bellows 35. A cylindrical capacitor electrode 39 with a dielectric coating 38 on its outer surfaces is mounted on the inside of the closed end of bellows 35. This electrode slide fits within cylindrical sleeve electrode 37, which is mounted on the inside of the closed end of bellows 36. Movement of electrode 39 is effected by turning of threaded drive shaft 41 which passes through threaded yoke 42 and is provided with knob 43. Dielectric liquid 44 fills the assembly.

As drive shaft 41 is moved along the axis of the assembly, moving control bellows 35, compensating bellows 36 is also moved to maintain hydraulic equilibrium. As previously explained, the net absolute movement of electrode 39 with respect to electrode 37 is in a ratio of $$\frac{D^2-d^2}{D^2}$$

with the movement of shaft 41, where D is the compensating bellows effective diameter and $d$ is the control bellows diameter. Thus if the diameters D and d were 1.5" and 1.0", respectively, the absolute electrode displacement would be about 0.56" for every inch that shaft 41 and bellows 35 moved.

Figure 4:
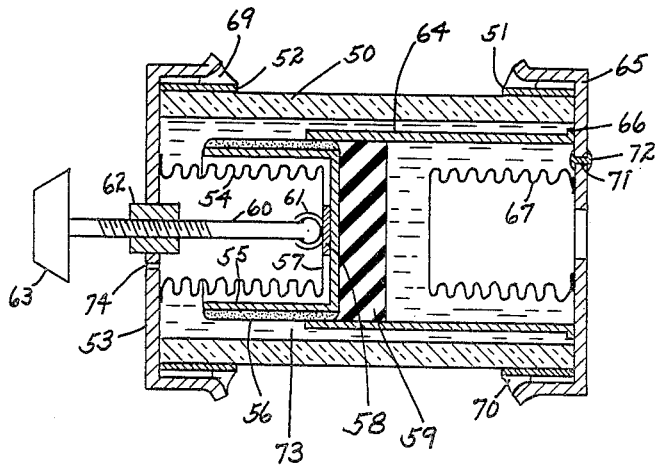

Referring now to Figure 4, there is shown a detailed cross-section of another hermetically sealed variable capacitor embodying the invention. 50 represents a cylindrical glass tube provided with integrally sealed metallized bands 51 and 52 on its outer periphery at the ends of the tube. At one end of the tube, substantially rigid metal end cap 53 is mounted, serving as a base to which control bellows 54 and threaded yoke 62 are affixed. Threaded drive shaft 60 passes through yoke 62 and is attached to the inner end 57 of bellows 54 by means of a ball joint 61, which permits rotation of shaft 60 without rotation or twisting of bellows 54. Knob 63 is provided on shaft 60. On the inside of the inner end 57 of bellows 54 is securely mounted, by welding or soldering as shown at 58, electrode sleeve 55. This sleeve is provided with an adherent, ground dielectric coating 56, such as vitreous enamel, fused nickel oxide and the like. As a guide slug, insulating material 59 is provided at the end of electrode 55, being ground to the same outer diameter as that possessed by coating 56. In this manner, the electrode 55 may be removed entirely from displacement within cooperating electrode sleeve 64, providing a very low minimum electrical capacity.

Cylindrical electrode sleeve 64 is mounted securely, as shown at 66, to substantially rigid metal end-cap 65 on the opposite end of tube 50. Within a portion of this sleeve is disposed compensating bellows 67, this bellows being mounted on end-cap 65 by welding, soldering, brazing and the like. As inner electrode 55 is moved within the confines of sleeve electrode 64, bellows 67 will contract, thus leaving room for the slug 59 and sleeve 55 to penetrate.

Hole 74 is provided in cap 53 for air entry within control bellows 54. Hole 71 permits filling of the device after complete assembly with dielectric liquid 73. Solder 72 is fused into hole 71 after dielectric filling.

End caps 65 and 53 are securely sealed to casing 50 by means of solder 70 and 69, respectively, the solder being joined to the metallized bands. It will be noted that the end caps of this device may serve as terminal elements and that the whole assembly may be mounted in fuse clips, because of the ferrule type closure.

In accordance with one of the limited embodiments of the invention, I may provide alternate bellows arrangements. Where rotary adjusting is desired, the control bellows may comprise a relatively long tube with a plurality of corrugations in a direction parallel with the tube axis, permitting rotary adjustment to angles of 180° or more depending upon the tube length, metal thickness, etc. Another bellows arrangement consists of a conical structure, in which the corrugations extend along the cone sides in planes which are at right angles to the cone axis. By inserting wires of diameter about equal to corrugation width in various of the corrugations of such a bellows, it is possible to vary the effective diameter of the bellows and thus permit, for example, variable ratio drives in a single assembly. The inserted wires would limit the bellows action of the particular corrugation.

As many different embodiments of this invention may be made without departing from the spirit and scope hereof, it is to be understood that the invention is not limited to the specific embodiments hereof except as defined in the appended claims.

What I claim is:

1. A hermetically sealed variable electrical device comprising a first tube-shaped electrical component, a second electrical component movably held for adjustable penetration within the tube formed by the first component to electrically cooperate in providing a variable electrical characteristic, adjusting structure connected to adjustably move said second component, both of said relatively adjustable electrical components being disposed within a rigid hermetically sealed casing filled with a fluid medium, said adjusting structure including a first bellows connected between the casing and said second electrical component to provide an adjustable sealed connection to this component, and a second bellows providing compensation for volume and pressure changes within said casing resulting from temperature changes and from movement of said first bellows, said second bellows extending inwardly from the casing and into the tube formed by the first electrical component and having an expansion range extending within at least a portion of the adjustment range of travel of said second component, to provide a compact construction in which adjusting movement of the second component into the first component causes the second bellows to expand in volume and causes the first bellows to contract by a corresponding volume and make way for the second component.

2. A hermetically sealed variable electrical capacitor assembly comprising an inner electrode and an outer electrode, said outer electrode being in the form of a sleeve for selectably receiving adjustable portions of the inner electrode, a substantially rigid tubular housing enveloping said electrodes and each end of said housing being closed by means of an end cap, first and second bellows within said housing, said first bellows being connected as an adjustable seal between one housing cap and the inner electrode, the second bellows being a compensating bellows ; :ojecting from the other housing cap into the electrode sleeve and into an appreciable portion of the adjustment range of the inner electrode, the housing being filled with a dielectric liquid and the interior of each bellows being in communication with the exterior of the housing to provide a compact adjustable construction in which adjusting movement of the inner electrode into the electrode sleeve expands the volume of the first bellows and causes the second bellows to contract by a corresponding volume and make way for the inner electrode.

3. The combination as defined by claim 4 in which the inner electrode forms part of an adjustable holding structure that fits closely within the sleeve end, and one of the electrodes carries projecting pilot structure to guide the relative movement of the electrodes and enable the entrance of the inner electrode into the sleeve after complete disengagement from it.

4. A compact hermetically sealed variable capacitor comprising a casing, an elongated capacitor electrode within the casing, a tubular capacitor electrode in the form of a sleeve for the first electrode, externally operable adjusting structure connected to one of the electrodes for moving it through a predetermined range and varying its sleeved engagement with the other to change the capacitance of the capacitor, said adjusting structure including an adjustable bellows connected to the movable electrode and entirely within the casing for sealing it through such electrode movement range, a dielectric fluid filling the sealed casing, and a compensating bellows entirely within the casing and having a compensating range extending within the confines of an appreciable portion of those sections of the tubular electrode which are capacitively effective when the electrodes are in the position of maximum capacitance to seal the dielectric fluid in the casing, compensate for changes in electrode adjustment as well as thermally induced changes in fluid volume, and at the same time reduce the volume of fluid required to fill the casing.

DAVID B. PECK.

REFERENCES CITED

The following references are of record in the file of this patent:

UNITED STATES PATENTS

| Number | Name | Date |
|---|---|---|
| 2,036,532 | Knoll et al. | Apr. 7, 1936 |
| 2,204,166 | Usselman | June 11, 1940 |
| 2,511,338 | Jennings | June 13, 1950 |

FOREIGN PATENTS

| Number | Country | Date |
|---|---|---|
| 484,271 | Great Britain | May 3, 1938 |
| 589,728 | Great Britain | June 27, 1947 |

Certificate of Correction

Patent No. 2,575,726

November 20, 1951

DAVID B. PECK

It is hereby certified that error appears in the printed specification of the above numbered patent requiring correction as follows:

Column 8, line 1, for the claim reference numeral "4" read *2*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*